April 13, 1926.
C. H. FOLSOM
MEASURING DEVICE
Filed March 2, 1925.
1,581,047
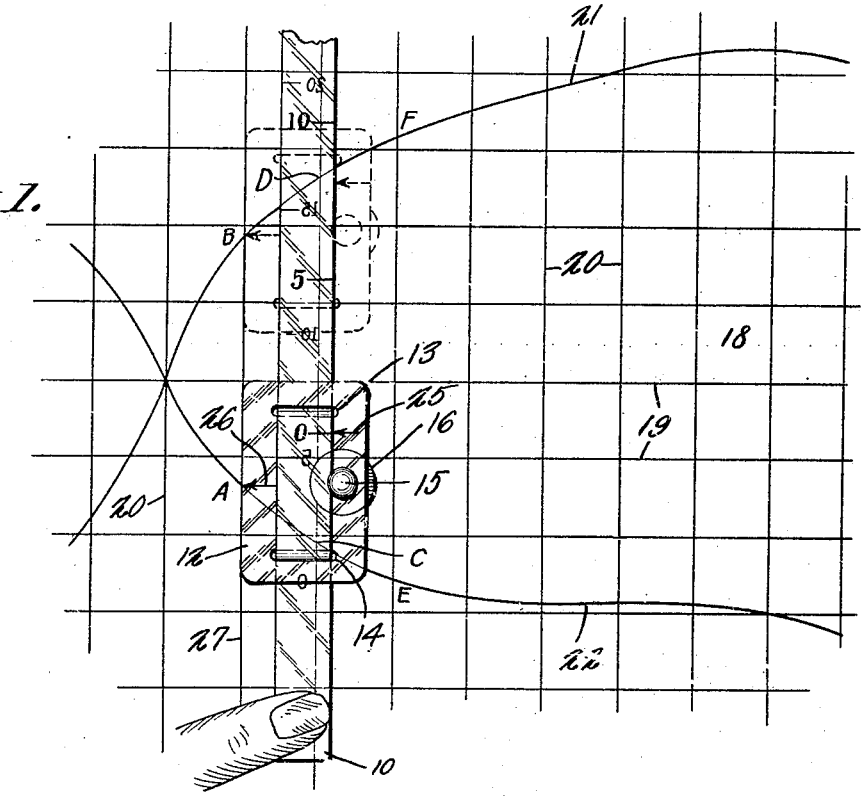
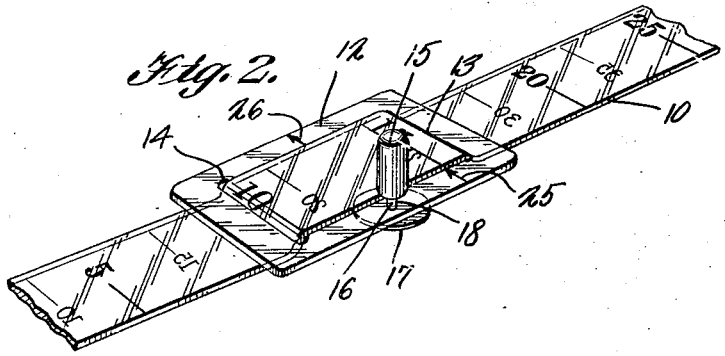
C.H. Folsom,
INVENTOR
BY Victor J. Evans
ATTORNEY
WITNESS:

Patented Apr. 13, 1926.

1,581,047

UNITED STATES PATENT OFFICE.

CHARLES H. FOLSOM, OF AUGUSTA, MAINE.

MEASURING DEVICE.

Application filed March 2, 1925. Serial No. 12,705.

*To all whom it may concern:*

Be it known that I, CHARLES H. FOLSOM, citizen of the United States, residing at Augusta, in the county of Kennebec and State of Maine, have invented new and useful Improvements in Measuring Devices, of which the following is a specification.

The object of this invention is to provide a device designed for measuring the area of irregular surfaces, and termed an areameter.

A further object is to provide an article including a scale member or tape, and a slide, the scale being graduated to enable the user to ascertain the area defined by irregular lines on a surface on which parallel lines indicate units of known area, —the total of the units being approximately equivalent to the area of the surface to be measured.

With the foregoing and other objects in view, the invention consists in the novel arrangement of elements, and in the manner of applying them in use, as more fully disclosed hereinafter, and as illustrated in the accompanying drawings, in which—

Figure 1 shows the device in plan, as applied to a surface defined by irregular lines on a surface ruled to indicate units of known area;

Figure 2 is a perspective view of the device per se.

A scale in the form of a tape, designated 10, may be of transparent or other material, and is provided with graduations on opposite sides, or opposite edges, the figures representing the measurement of unit spaces or defining the areas between parallel lines on a prepared surface. The graduations on opposite sides or edges of the tape indicate different units of measurement, the space between adjacent index marks representing one unit.

A slide 12, also transparent, is provided with transverse slots 13, 14, through which the tape passes in the manner illustrated, and a knob or handle 15 is employed as a holding device and for retaining the tape temporarily in a given position with reference to the slide. An element such as a pin 16 with a large flat head 17 passes through the aperture 18 in the slide, and thence into the end of the element 15, so that when the latter is pressed down on the pin the required temporary engagement will be effected. Handle 15 is grasped by the user when moving the slide along the scale or tape.

A surface providing squares of unit area is designated 18, one series of lines thereon is shown at 19, and lines 20 run perpendicular to the lines 19, for the purpose indicated.

The surface to be measured is between irregular lines 21 and 22, and to the right of line 27.

In use, the index mark or arrow 25 is set, for example, at the zero mark on the scale or tape, and the index mark or arrow 26 is placed at A on line 27, at the point of intersection with line 22. The slide is then moved until arrow 26 is at B, and the slide is held at that position on the tape while the entire device is moved to the next parallel line and placed so that arrow 26 coincides with C.

The slide is then moved to the point D, and held by the knob in this position on the tape until the entire device is transferred to the next line 29, arrow 26 being placed at E, for measuring the distance E—F.

This operation is continued as long as necessary, and the user then reads the total area indicated by figures (opposite arrow 25) on scale or tape 10.

The device may be economically manufactured, is easily carried, and therefore useful in field work, and is readily operated.

What I claim is:

1. A device of the class described, comprising a graduated tape having designations thereon indicating area, a slide carrying an index mark for cooperation with the graduations on the tape, and carrying an index mark for measuring equally spaced parallel lines, the length of which constitutes a factor in computing area between lines intersecting the parallel lines, said slide having slots therein and the tape passing freely through the slots to permit of advancing the slide relative to the tape and tape holding means engaging the slide on opposite sides and engaging the tape, said tape engaging both of the outer surfaces of the slide.

2. A device of the class described, comprising a graduated tape having designations thereon indicating area, a slide movable along the tape and carrying index marks on opposite sides thereof, a knob positioned above the slide, and a headed pin passing through the slide into the knob, said knob and pin being adapted to hold the slide with reference to the tape, one of the index marks cooperating with the designations on the tape and the other cooperating with predetermined points on a surface the area of which is to be measured.

3. A device of the class described, comprising a graduated tape having designations thereon, and a slide movable along the tape and having slots therein through which the tape passes, said slide and tape being of transparent material, and a combined handle and holding device mounted on the slide and adapted under pressure to retain the slide and tape against relative movement.

In testimony whereof I affix my signature.

CHARLES H. FOLSOM.